Nov. 19, 1957 P. J. DURAN 2,813,377
MULTIPLE SLICING TOOLS
Filed Aug. 25, 1955

INVENTOR
PATRICK J. DURAN
BY
ATTORNEY

United States Patent Office 2,813,377
Patented Nov. 19, 1957

2,813,377

MULTIPLE SLICING TOOLS

Patrick J. Duran, Needham, Mass., assignor to Raytheon Manufacturing Company, Waltham, Mass., a corporation of Delaware Application August 25, 1955, Serial No. 530,555

8 Claims. (Cl. 51—59)

This invention relates to multiple blade tool assemblies, and more particularly to such tool assemblies for use in slicing quartz crystals and other very hard materials when used with an abrasive slurry and means for imparting a very rapid reciprocatory motion in the direction of the desired cut.

In tools of this type, difficulty is experienced in keeping the cut faces parallel as is essential in the production of quartz crystals cut for use as frequency determining elements in electrical oscillators. The slurry in working its way down between the blades and the already cut faces of the material tends to lap the material from the cut faces more at the top than at the bottom or working face. The result is that the slices become wedge shape rather than rectangular parallelepipeds.

By the construction of the present invention, the individual blades are formed with undercuts on either side to form a region of reduced thickness in the central portion. The blades are assembled with separators in the form of an inverted U between the blades with the arms of the U at either end of the blades they separate, and the cross bar of the U at the back edge of the blades. The separators are not quite as long as the blades, leaving spaces that provide a larger area for welding, soldering or brazing material to be attached forming stronger joints. Passages are formed in the completed assembly to provide paths by which the abrasive slurry may be brought into the space between the cutting edges of the blades and the material being cut. The undercut regions on either side of the blades back of the cutting area permit the slurry to flow freely to and from the cutting areas without appreciably lapping the already cut surfaces of the crystals. The region of original thickness near the cutting ends of the blades is made as short as possible to prevent lapping of the cut surfaces. However, with wear the cutting ends of the blades become rounded and must be ground flat and square again so that the number of such grinding operations is greater and the life of the assembly is longer as the length of this region of original thickness near the cutting edge is increased.

The result is a cheaply made multiple blade assembly that makes a plurality of slices, having parallel faces, from a piece of hard material.

The foregoing and other advantages of this invention will be better understood from the following description taken in conjunction with the accompanying drawing wherein.

Figure 1:
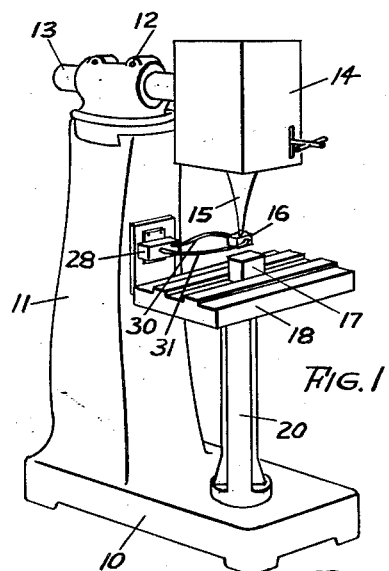
Fig. 1 is an isometric view of an ultrasonic drill embodying the invention.
Figure 4:
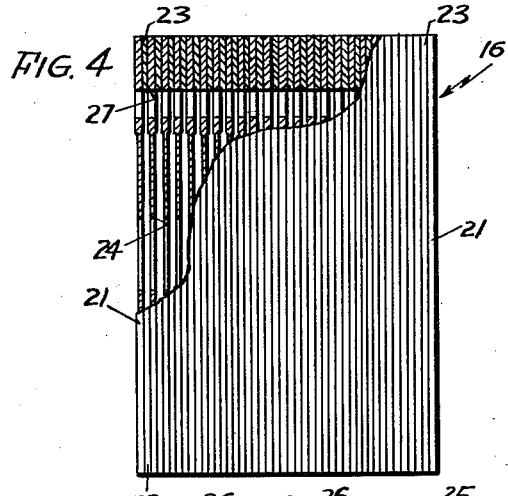
Fig. 4 is an end view partly broken away of the blade assembly of Fig. 2.

In Fig. 1 the reference numeral 10 designates the base of the machine tool utilizing the invention. This base is formed with a pedestal 11 having an adjustable holder 12 for a horizontal shaft 13 supporting a sonic drill 14 in a manner to permit horizontal positioning. The sonic drill may be of the type disclosed in the U. S. Patent No. 2,651,148 to P. B. Carwile. Such a drill is driven by a magnetostrictive transducer (not shown) supplied with oscillatory electrical energy from an oscillator (not shown). The transducer is coupled through a conical impedance transformer 15 to a blade subassembly 16 of the invention. The work 17 is adjustably held beneath the blade subassembly 16 by means of a work holder 18 supported on the base 10 by a second pedestal 20. If more convenient, the work may be supported on the tip of the impedance transformer and held against the blade assembly. Other means for producing a reciprocating relative motion between the blades and the work may be used.

Figure 2:
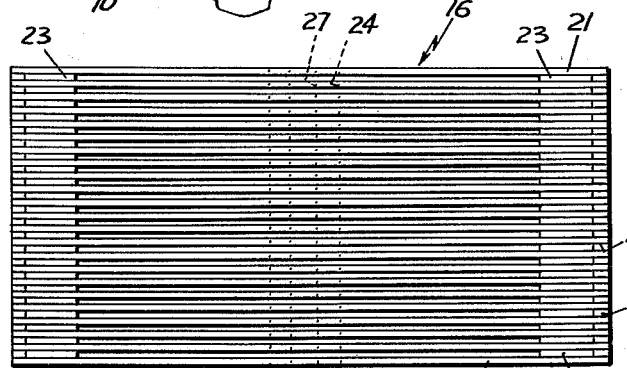
Fig. 2 is a bottom view of the blade assembly for multiple slicing with a tool such as that shown in Fig. 1.
Figure 3:
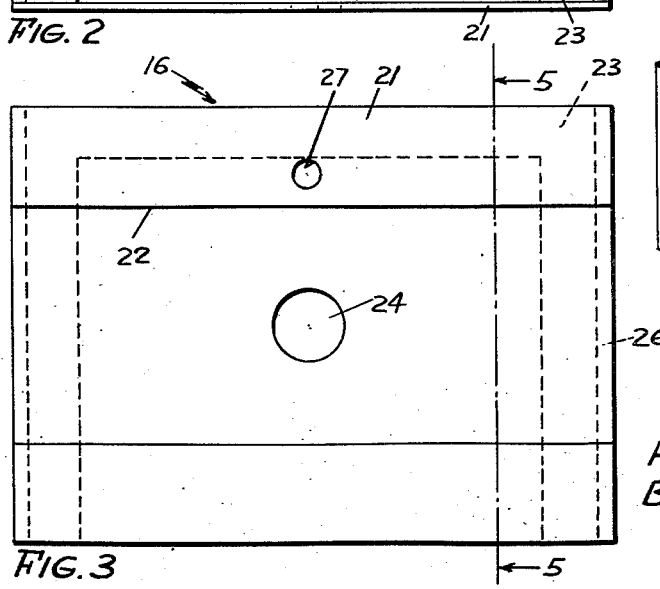
Fig. 3 is a side view of the blade assembly of Fig. 2.
Figure 6:
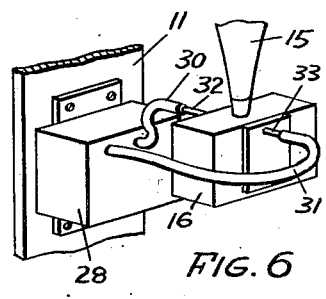
Fig. 6 is a detail of Fig. 1 showing the means for supplying the slurry.

The blade subassembly 16 is formed of a plurality of blades 21 formed from metallic plates, each formed with depressions 22, one in the central region of each side face of the plate. The blades are mounted parallel to each other and separated by U-shaped separators 23, best seen in Fig. 3, leaving the cutting edges free at the bottom as shown in Fig. 2. The U-shaped separators 23 are not as long as the blades 21. The blades and separators are assembled by the steps of drilling a large hole 24 through each blade 21 near the center and passing a bolt through this hole and tightening it with a nut to hold the blades and separators together in a compact block. Other means for holding the block in position, while it is being built, may be used. Due to the shorter length of the separators, recesses 25 are left near each end of the blade. These recesses 25 provide a greater area for a welding, brazing or soldering material 26 to adhere to and hold the blades together. After the blades and separators are attached together in this or any other convenient manner, the cutting edges are trued off by grinding, and a small hole 27 is drilled into the blades 21 near the top at the center, but below the separators 23, as shown in Fig. 3, so as to permit the introduction of an abrasive slurry into the spaces between blades 21. Slurry is introduced to this hole 27 from a reservoir 28 by means of tubes 30 and 31 that are preferably flexible. These tubes are in alignment with the ends of the hole 27 by welding or any other convenient method. A pump may be used to convey the slurry into the passages between the blades if needed.

Figure 5:
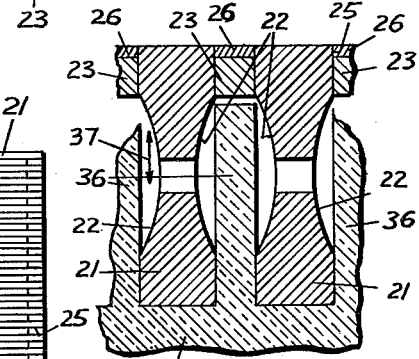
Fig. 5 is a section along the line 5—5 of Fig. 3 on an enlarged scale with certain dimensions distorted for clarity.

The manner in which the depressions or recesses 22 assist in keeping the cuts parallel may be best seen in Fig. 5 where the depth of recesses 22 relative to the length and thickness of the blades is exaggerated for purposes of illustration. Actually, the recesses 22 are only a few thousandths of an inch deep in a representative blade assembly. It can be seen that as the blades 21 penetrate the material 35 being sliced, the slurry will penetrate between the sides of the blades and the faces of the slices 36. As the blades 21 and slices 36 move longitudinally in relation with each other, as indicated by the arrow 37, the abrasive slurry will tend to wear away the faces of the slices 36. This effect will be greatest near the top as more slurry will be there for a longer time, thus lapping the faces of the slices out of parallel and making them wedge shaped which is undesirable especially when quartz crystals are being cut. The presence of the recesses 22 reileves the pressure on the slurry so that it is not held in contact with the faces of the slices during the reciprocal relative motion of the slices 36 and the blades 21. Only in the lower portion of the blades do the faces of the blades hold the slurry tightly against the faces of the slices during the motion, but this is only for a relatively short time for any particular portion of the faces of the slices so that the lapping and wedging action is negligible. The result is a subassembly of blades that are adapted to slice hard material, such as quartz, silicon and germanium, without wedging to produce slices with parallel faces.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a device for forming slices of a hard material with parallel faces, a plurality of cutting blades each formed with a central region of reduced thickness rigidly attached together and separated by spacers of a thickness determined by the desired thickness of the slices to be produced and of a shape to contact adjacent blades along their peripheries except along their cutting edges, means to impart a relative reciprocal motion between the blades and the material to be cut, and openings into the spaces between the blades adapted to introduce an abrasive slurry between the blades and the material to be cut.

2. In a device for forming slices of a hard material with parallel faces, a plurality of cutting blades with cutting edges of rectangular cross section each formed with a central region of reduced thickness rigidly attached together and separated by spacers of a thickness determined by the desired thickness of the slices to be produced and of a shape to contact adjacent blades along their peripheries except along their cutting edges, means to impart a relative reciprocal motion between the blades and the material to be cut, and openings into the spaces between the blades adapted to introduce an abrasive slurry between the blades and the material to be cut.

3. In a device for forming slices of a hard material with parallel faces, a plurality of cutting blades each formed with a central region of reduced thickness rigidly attached together and separated by spacers of a U-shape opening toward the faces of the cutting blades and of a thickness determined by the desired thickness of the slices to be produced, means to impart a relative reciprocal motion between the blades and the material to be cut, and openings into the spaces between the blades adapted to introduce an abrasive slurry between the blades and the material to be cut.

4. In a device for forming slices of a hard material with parallel faces, a plurality of cutting blades each formed with a central region of reduced thickness rigidly attached together and separated by spacers of a thickness determined by the desired thickness of the slices to be produced and of a shape to contact adjacent blades along their peripheries except along their cutting edges, means to impart a relative reciprocal motion between the blades and the material to be cut, openings into the spaces between the blades adapted to introduce an abrasive slurry between the blades and the material to be cut, and means adapted for connecting said openings to a source of abrasive slurry.

5. In a device for forming slices of a hard material with parallel faces, a plurality of cutting blades with cutting edges of rectangular cross section each formed with a central region of reduced thickness rigidly attached together and separated by spacers of a U-shape opening toward the faces of the cutting blades and of a thickness determined by the desired thickness of the slices to be produced, means to impart a relative reciprocal motion between the blades and the material to be cut, and openings into the spaces between the blades adapted to introduce an abrasive slurry between the blades and the material to be cut.

6. In a device for forming slices of a hard material with parallel faces, a plurality of cutting blades with cutting edges of rectangular cross section each formed with a central region of reduced thickness rigidly attached together and separated by spacers of a thickness determined by the desired thickness of the slices to be produced and of a shape to contact adjacent blades along their peripheries except along their cutting edges, means to impart a relative reciprocal motion between the blades and the material to be cut, openings into the spaces between the blades adapted to introduce an abrasive slurry between the blades and the material to be cut, and means adapted for connecting said openings to a source of abrasive slurry.

7. In a device for forming slices of a hard material with parallel faces, a plurality of cutting blades each formed with a central region of reduced thickness rigidly attached together and separated by spacers of a U-shape opening toward the faces of the cutting blades and of a thickness determined by the desired thickness of the slices to be produced, means to impart a relative reciprocal motion between the blades and the material to be cut, openings into the spaces between the blades adapted to introduce an abrasive slurry between the blades and the material to be cut, and means adapted for connecting said openings to a source of abrasive slurry.

8. In a device for forming slices of a hard material with parallel faces, a plurality of cutting blades with cutting edges of rectangular cross section each formed with a central region of reduced thickness rigidly attached together and separated by spacers of a U-shape and of a thickness determined by the desired thickness of the slices to be produced, means to impart a relative reciprocal motion between the blades and the material to be cut, openings into the spaces between the blades adapted to introduce an abrasive slurry between the blades and the material to be cut, and means adapted for connecting said openings to a source of abrasive slurry.

References Cited in the file of this patent

UNITED STATES PATENTS

| | | |
|---|---|---|
| 39,946 | Moore | Sept. 15, 1863 |
| 1,549,525 | Cooney | Aug. 11, 1925 |
| 1,767,390 | Moses | June 24, 1930 |
| 1,951,488 | Newton | Mar. 20, 1934 |
| 2,525,098 | Hougland | Oct. 10, 1950 |
| 2,543,527 | Gyuris | Feb. 27, 1951 |